United States Patent
Tham et al.

(10) Patent No.: US 8,893,510 B2
(45) Date of Patent: Nov. 25, 2014

(54) AIR INJECTION SYSTEM IN A GAS TURBINE ENGINE

(71) Applicants: Kok-Mun Tham, Oviedo, FL (US);
 Ching-Pang Lee, Cincinnati, OH (US);
 Brian H. Terpos, Oviedo, FL (US);
 Dustan M. Simko, Charlotte, NC (US)

(72) Inventors: Kok-Mun Tham, Oviedo, FL (US);
 Ching-Pang Lee, Cincinnati, OH (US);
 Brian H. Terpos, Oviedo, FL (US);
 Dustan M. Simko, Charlotte, NC (US)

(73) Assignee: Siemens Aktiengesellschaft, München (DE)

(*) Notice: Subject to any disclaimer, the term of this patent is extended or adjusted under 35 U.S.C. 154(b) by 112 days.

(21) Appl. No.: 13/670,615

(22) Filed: Nov. 7, 2012

(65) Prior Publication Data

US 2014/0123675 A1 May 8, 2014

(51) Int. Cl.
 *F02C 6/04* (2006.01)
 *F02C 7/12* (2006.01)
 *F01D 5/08* (2006.01)
 *F02C 7/18* (2006.01)
 *F01D 21/00* (2006.01)
 *F01D 25/12* (2006.01)

(52) U.S. Cl.
 CPC . *F02C 7/18* (2013.01); *F01D 5/088* (2013.01); *F01D 21/00* (2013.01); *F05D 2270/3032* (2013.01); *F01D 25/12* (2013.01)
 USPC ............................................... 60/785; 60/806

(58) Field of Classification Search
 USPC .............. 60/793, 773, 802, 785, 806, 805
 See application file for complete search history.

(56) References Cited

U.S. PATENT DOCUMENTS

| | | | |
|---|---|---|---|
| 6,478,534 B2 | 11/2002 | Bangert et al. | |
| 7,329,084 B2 | 2/2008 | Dittmann et al. | |
| 7,682,130 B2 | 3/2010 | Jurjevic | |
| 7,766,610 B2 | 8/2010 | Busekros et al. | |
| 7,798,767 B2 | 9/2010 | Kondo et al. | |
| 7,987,660 B2 | 8/2011 | Iwasaki et al. | |
| 8,087,251 B2 | 1/2012 | Iwasaki et al. | |
| 2009/0056342 A1 | 3/2009 | Kirzhner | |
| 2010/0068035 A1 | 3/2010 | Roush et al. | |
| 2010/0189551 A1 | 7/2010 | Ballard, Jr. et al. | |
| 2011/0072827 A1* | 3/2011 | Ciofini et al. .................. | 60/772 |

FOREIGN PATENT DOCUMENTS

| | | |
|---|---|---|
| DE | 4411616 A1 | 10/1995 |
| EP | 1895095 A1 | 3/2008 |

OTHER PUBLICATIONS

Klempner "Operation and Maintenance of Large Turbo-Generators", 2004, IEEE, pp. 121, 123.*

* cited by examiner

*Primary Examiner* — Phutthiwat Wongwian
*Assistant Examiner* — William Breazeal

(57) ABSTRACT

An air injection system for use in a gas turbine engine includes at least one outlet port through which air is extracted from the engine only during less than full load operation, at least one rotor cooling pipe, which is used to inject the air extracted from the outlet port(s) into a rotor chamber, a piping system that provides fluid communication between the one outlet port(s) and the rotor cooling pipe(s), a blower system for extracting air from the engine through the outlet port(s) and for conveying the extracted air through the piping system and the rotor cooling pipe(s) into the rotor chamber, and a valve system. The valve system is closed during full load engine operation to prevent air from passing through the piping system, and open during less than full load engine operation to allow air to pass through the piping system.

20 Claims, 3 Drawing Sheets

AIR INJECTION SYSTEM IN A GAS TURBINE ENGINE

FIELD OF THE INVENTION

The present invention relates to an air injection system in a gas turbine engine, wherein the system is operable during less than full load operation to create a more uniform air temperature distribution within select areas of the engine.

BACKGROUND OF THE INVENTION

During operation of a gas turbine engine, air is pressurized in a compressor section then mixed with fuel and burned in a combustion section to generate hot combustion gases. In a can annular gas turbine engine, the combustion section comprises an annular array of combustor apparatuses, sometimes referred to as "cans" or "combustors", which each supply hot combustion gases to a turbine section of the engine where the hot combustion gases are expanded to extract energy therefrom to provide output power, which is in turn used to produce electricity.

SUMMARY OF THE INVENTION

In accordance with the present invention, a gas turbine engine is provided comprising a compressor section where air pulled into the engine is compressed, a combustion section where fuel is mixed with at least a portion of the compressed air from the compressor section and burned to create hot combustion gases, and a turbine section where the hot combustion gases from the combustion section are expanded to extract energy therefrom. At least a portion of the extracted energy is used to rotate a turbine rotor during a first mode of engine operation comprising full load operation. The engine further comprises a rotor chamber in communication with structure to be cooled within the turbine section, at least one rotor cooling pipe that injects primary path air extracted from the engine into the rotor chamber during the first mode of engine operation, and an air injection system. The air injection system comprises at least one outlet port through which secondary path air is extracted from the engine only during a second mode of engine operation comprising less than full load operation, the at least one rotor cooling pipe, which is used to inject the secondary path air extracted from the at least one outlet port into the rotor chamber during the second mode of engine operation, a piping system that provides fluid communication between the at least one outlet port and the at least one rotor cooling pipe, a blower system for extracting the secondary path air from the engine through the at least one outlet port and for conveying the extracted secondary path air through the piping system and the at least one rotor cooling pipe into the rotor chamber, and a valve system. The valve system is closed during the first mode of engine operation to prevent secondary path air from being extracted from the engine and conveyed through the piping system by the blower system, and open during the second mode of engine operation to allow secondary path air to be extracted from the engine and conveyed through the piping system by the blower system.

In accordance with a second aspect of the present invention, a gas turbine engine is provided comprising a compressor section where air pulled into the engine is compressed, a combustion section, and an engine casing including a portion that surrounds the combustion section. The engine casing portion defines a combustor shell containing shell air, at least a portion of which is burned with fuel in the combustion section to create hot combustion gases during a first mode of engine operation comprising full load operation. The engine further comprises a turbine section where the hot combustion gases from the combustion section are expanded to extract energy therefrom. At least a portion of the extracted energy is used to rotate a turbine rotor during the first mode of engine operation. The engine still further comprises a rotor chamber at least partially located in the combustion section and in communication with structure to be cooled within the turbine section, at least one rotor cooling pipe that injects primary path air extracted from the combustor shell into the rotor chamber during the first mode of engine operation, and an air injection system. The air injection system comprises at least one outlet port provided in the engine casing portion through which secondary path air is extracted from the combustor shell only during a second mode of engine operation comprising less than full load operation, the at least one rotor cooling pipe, which is used to inject the secondary path air extracted through the at least one outlet port into the rotor chamber during the second mode of engine operation, a piping system that provides fluid communication between the at least one outlet port and the at least one rotor cooling pipe, a blower system for extracting the secondary path air through the at least one outlet port and for conveying the extracted secondary path air through the piping system and the at least one rotor cooling pipe into the rotor chamber, and a valve system. The valve system is closed during the first mode of engine operation to prevent secondary path air from being extracted from the combustor shell and conveyed through the piping system by the blower system, and open during the second mode of engine operation to allow secondary path air to be extracted from the combustor shell and conveyed through the piping system by the blower system.

In accordance with a third aspect of the present invention, a method is provided for operating a gas turbine engine. Air is compressed in a compressor section of the engine. Fuel and at least a portion of the compressed air are mixed and the mixture is burned in a combustion section of the engine to create hot combustion gases. The hot combustion gases are expanded to extract energy therefrom in a turbine section of the engine, wherein at least a portion of the extracted energy is used to rotate a turbine rotor during a first mode of engine operation comprising full load operation. Primary path air extracted from the engine is injected into a rotor chamber through at least one rotor cooling pipe during the first mode of engine operation. The injected primary path air provides cooling to structure to be cooled within the turbine section. During a second mode of engine operation comprising less than full load operation, operation of a blower system is enabled to extract secondary path air from a combustor shell through at least one outlet port located in an engine casing portion associated with the combustion section, to convey the extracted secondary path air through a piping system to the at least one rotor cooling pipe, and to inject the extracted secondary path air into the rotor chamber through the at least one rotor cooling pipe.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiments, reference is made to the accompanying drawings that form a part hereof, and in which is shown by way of illustration, and not by way of limitation, a specific preferred embodiment in which the invention may be practiced. It is to be understood that other embodiments may be utilized and that changes may be made without departing from the spirit and scope of the present invention.

Figure 1:
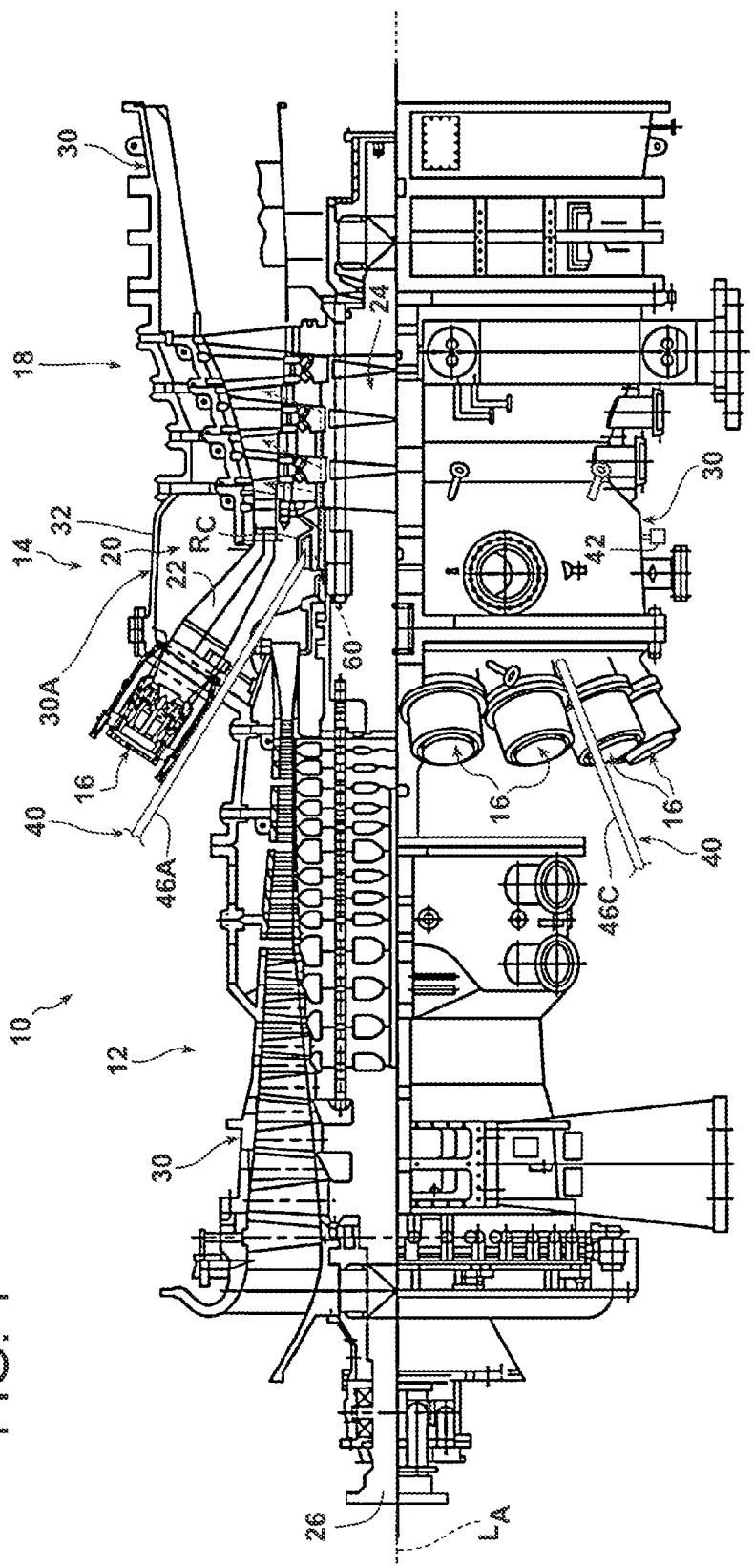
FIG. 1 is a side view, partially in section, of a gas turbine engine including an air injection system according to an embodiment of the invention.

Referring to FIG. 1, a gas turbine engine 10 constructed in accordance with the present invention is shown. The engine 10 includes a compressor section 12, a combustion section 14 including a plurality of combustors 16, also referred to herein as "combustor apparatuses," and a turbine section 18. It is noted that the engine 10 according to the present invention preferably comprises an annular array of combustors 16 that are disposed about a longitudinal axis $L_A$ of the engine 10 that defines an axial direction within the engine 10. Such a configuration is typically referred to as a "can-annular combustion system."

The compressor section 12 inducts and pressurizes inlet air, at least a portion of which is directed to a combustor shell 20 for delivery to the combustors 16. The air in the combustor shell 20 is hereinafter referred to as "shell air". Other portions of the pressurized air may be extracted from the compressor section 12 to cool various components within the engine 10, such as components in the turbine section 18.

Upon entering the combustors 16, the compressed air from the compressor section 12 is mixed with fuel and ignited to produce high temperature combustion gases flowing in a turbulent manner and at a high velocity within the respective combustor 16. The combustion gases in each combustor 16 then flow through a respective transition duct 22 (only one transition duct 22 is shown in FIG. 1) to the turbine section 18 where the combustion gases are expanded to extract energy therefrom. A portion of the energy extracted from the combustion gases is used to provide rotation of a turbine rotor 24, which extends parallel to a rotatable shaft 26 that extends axially through the engine 10 along the longitudinal axis $L_A$.

Figure 2:
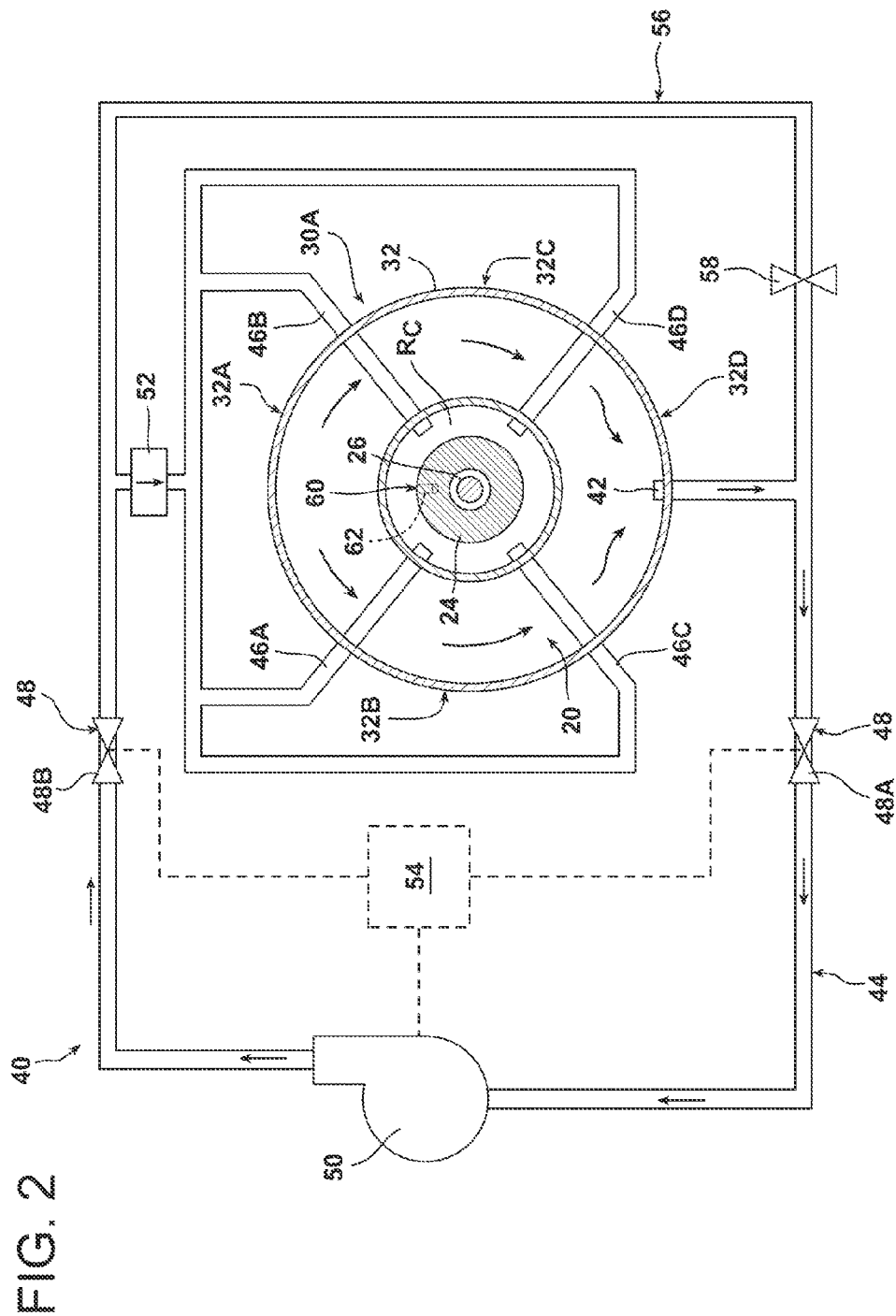
FIG. 2 is a schematic illustration of the air injection system illustrated in FIG. 1.

As shown in FIG. 1, an engine casing 30 is provided to enclose the respective engine sections 12, 14, 18. A portion 30A of the casing 30 disposed about the combustion section 14 comprises a casing wall 32 that defines the combustor shell 20, i.e., the combustor shell 20 defines an interior volume within the casing portion 30A. As shown in FIG. 2, the casing wall 32 includes a top wall section 32A, left and right side wall sections 32B, 32C, and a bottom wall section 32D.

Referring to FIG. 2, an air injection system 40 according to an aspect of the present invention will now be described. The air injection system 40 in the embodiment shown comprises an outlet port 42 located at the bottom wall section 32D of the casing wall 32, see also FIG. 1. While the air injection system 40 according to this embodiment comprises only a single outlet port 42 located at the bottom wall section 32D of the casing wall 32, any suitable number of outlet ports could be provided, and the outlet port(s) 42 could be located elsewhere axially within the casing portion 30A and/or elsewhere around the circumference of the casing wall 32.

The air injection system 40 further comprises a piping system 44 that is provided to convey shell air that is extracted from the combustor shell 20 through the outlet port 42 to a plurality of rotor cooling pipes 46A, 46B, 46C, 46D, which are generally evenly spaced apart about the circumference of the casing wall 32, as shown in FIG. 2. While the air injection system 40 according to this embodiment comprises four rotor cooling pipes 46A-D, any suitable number of rotor cooling pipes could be provided. As will be discussed below, the rotor cooling pipes 46A-D inject the extracted shell air into a rotor chamber $R_C$, which is in communication with structure to be cooled within the turbine section 18, such as, for example, rows of rotatable turbine blades $T_B$, blade disc structures $B_{DS}$ that support the rows of turbine blades $T_B$ and which form part of the rotor 24, and/or turbine disc cavities $T_{DC}$ located between the blade disc structures $B_{DS}$ and adjacent rows of stationary turbine vanes $T_V$, see FIG. 1A. As shown most clearly in FIG. 1A, the rotor chamber $R_C$ is at least partially located in the combustion section 14 and is isolated from the combustor shell 20, i.e., the rotor chamber Rc has no direct exposure to the combustor shell 20.

As shown in FIG. 2, the air injection system 40 still further comprises a valve system 48 comprising first and second valves 48A, 48B in the embodiment shown although additional or fewer valves may be used, a blower system 50 comprising a single blower in the embodiment shown although additional blowers or ejectors may be used, and, optionally, a shell air cooler 52. The valve system 48 and the blower system 50 are controlled by a controller 54 to selectively allow or prevent shell air from passing through the piping system 44, as will be described in detail below. The blower system 50 is provided for extracting shell air from the combustor shell 20 through the outlet port 42 and for conveying the extracted shell air through the piping system 44 to the rotor cooling pipes 46A-D and into the rotor chamber $R_C$ when the valve system 48 is open, as will be described below. The shell air cooler 52 is provided for cooling the extracted shell air.

A method for operating the engine 10 will now be described. During normal operation of the engine 10, also known as full load or base load operation and also referred to herein as a first mode of engine operation, a pressure differential between the combustor shell 20 and the rotor chamber $R_C$ causes some of the shell air to flow out of the combustor shell 20 through the outlet port 42 toward the rotor chamber $R_C$, i.e., a pressure in the rotor chamber $R_C$ is lower than a pressure within the combustor shell 20 during normal operation of the engine 10. This portion of air that flows out of the combustor shell 20 through the outlet port 42 toward the rotor chamber $R_C$ during the first mode of engine operation is referred to herein as "primary path air." As shown in FIG. 2, the primary path air flows along a primary circuit 56 through a primary valve 58, which is only open during the first mode of engine operation, and passes through the cooler 52 for delivery into the rotor chamber $R_C$ through the rotor cooling pipes 46A-D. It is noted that while the primary path air described herein comprises shell air from the combustor shell 20, the primary path air could comprise air from other portions of the engine 10. For example, the primary path air could be bled directly off from the compressor section 12.

Figure 1A:
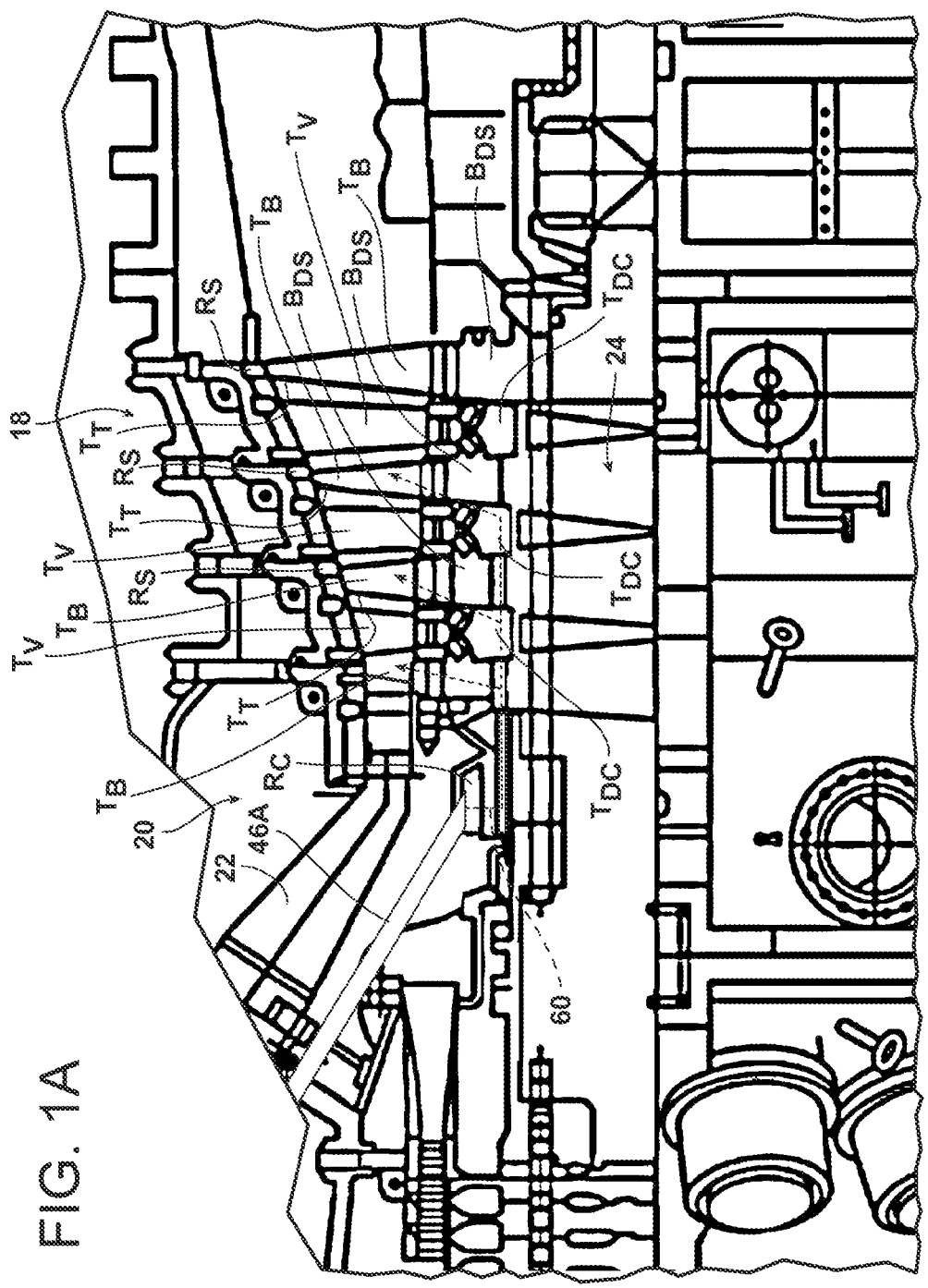
FIG. 1A is an enlarged portion of FIG. 1, illustrating a fluid circuit used to deliver cooling fluid to structure to be cooled within a turbine section of the engine.

Once in the rotor chamber $R_C$, the primary path air is delivered to the structure to be cooled in the turbine section 18 via a fluid circuit 60, see FIG. 1A. As will be apparent to those having ordinary skill in the art, the fluid circuit 60 may comprise, for example, a series of passages in the components between the rotor chamber $R_C$ and the structure to be cooled in the turbine section 18. For example, one or more passages 62 (see FIG. 2) may be formed through the rotor 24, which passages 62 may be in communication with passages (not shown) formed in the blade disc structures $B_{DS}$ in the turbine section 18. The passages in the blade disc structures $B_{DS}$ in turn may lead to the rows of turbine blades $T_B$ and/or the adjacent turbine disc cavities $T_{DC}$, as shown in FIG. 1A. It is noted that the cooling circuit 60 is schematically shown in FIG. 1A and could have any suitable configuration for delivering fluids to the structure to be cooled in the turbine section 18.

During the first mode of engine operation, the first and second valves 48A, 48B are closed and the blower system 50 is turned off or is otherwise not operational. Hence, the valve system 48 substantially prevents shell air from being extracted by the blower system 50 and from being conveyed by the blower system 50 through the piping system 44 and into the rotor chamber $R_C$, although it is noted that some shell air passes into the rotor chamber $R_C$ through the primary circuit 56 during the first mode of engine operation as discussed above.

Upon initiation of a turn down operation, which is implemented to transition the engine 10 to a shut down state or a turning gear state, the supply of fuel to the combustors 16 is eventually ceased, such that the production of high temperature combustion gases in the combustors 16 is decreased to null. Once combustion gases are no longer produced in the combustors 16, rotation of the turbine rotor 24 is not able to be effected by combustion gases, and rotation of the turbine rotor 24 coasts down to a near stop. After coasting to a near stop, slow rotation of the turbine rotor 24 may be effected by an outside power supply (not shown), such as by a start-up motor, in an operating state referred to herein as a turning gear state. In a typical engine 10, such a turn down operation may take at least about 10-15 minutes to completely transition the engine 10 to a turning gear state, during which time combustion in the combustors 16 is eventually stopped. Alternatively, rotation of the turbine rotor 24 may be completely stopped in an operating state referred to herein as a shut down state. The second mode of engine operation, as used herein, is meant to encompass turn down operation, a turning gear state, or a shut down state of the engine 10, which are all engine operating states that are less than full load operation, i.e., the first mode of engine operation.

According to an aspect of the present invention, upon initiation of a turn down operation to transition the engine 10 to either a turning gear state or a shut down state, the controller 54 opens the first and second valves 48A, 48B and closes the primary valve 58 to prevent air from passing through the primary circuit 56. The blower system 50 is turned on or is otherwise enabled by the controller 54 during the second mode of engine operation to extract shell air from the bottom wall section 32D of the casing wall 32 through the outlet port 42. The shell air extracted by the blower system 50 through the outlet port 42 during the second mode of engine operation is referred to herein as "secondary path air." The blower system 50 conveys, i.e., pumps, the extracted secondary path air through the piping system 44 and the rotor cooling pipes 46A-D and injects the extracted secondary path air into the rotor chamber $R_C$. Once in the rotor chamber $R_C$, the extracted secondary path air is delivered to cool the structure within the turbine section 18 via the fluid circuit 60, see FIG. 1A.

According to another aspect of the invention, the turning gear state may be run for a predetermined time or until one or more select engine components reaches a predefined temperature, at which point the engine 10 may be transitioned to a shut down state. Under this arrangement, during the turning gear state, the valves 48A, 48B are maintained in open positions and operation of the blower system 50 is continued to extract secondary path air from the bottom wall section 32D of the casing wall 32 through the outlet port 42, to convey the extracted secondary path air through the piping system 44 and the rotor cooling pipes 46A-D, and to inject the extracted secondary path air into the rotor chamber $R_C$. However, upon the engine 10 entering the shut down state, i.e., after completion of the turning gear state, the blower system 50 may be turned off or otherwise disabled by the controller 54 to stop the pumping of secondary path air. During the shut down state, the valves 48A, 48B may remain open or the controller 54 may close them, but they would be closed by the controller 54 and the primary valve 58 would be opened upon the initiation of an engine start up procedure to transition the engine 10 back to full load operation.

According to yet another aspect of the invention, during the second mode of engine operation the controller 54 may open/close the valve system 48 and enable/disable operation of the blower system 50 based on a temperature differential between the top wall section 32A of the engine casing portion 30A and the bottom wall section 32D of the engine casing portion 30A. For example, during the second mode of engine operation, if the temperature at the top wall section 32A is determined to be greater than the temperature at the bottom wall section 32D by more than a first predetermined amount, the valve system 48 may be opened and operation of the blower system 50 may be enabled until the temperature at the top wall section 32A is determined to be greater than the temperature at the bottom wall section 32D by less than a second predetermined amount. It is noted that temperature differentials at other locations within the engine 10 may also be used to activate the opening/closing of the valve system 48 and enabling/disabling operation of the blower system 50, such as, for example, temperature differentials between top and bottom sections of the portion of the casing 30 associated with the turbine section 18.

As shown by the arrows indicating the flow of shell air within the combustor shell 20 during operation of the air injection system 40 in FIG. 2, the secondary path air extracted from the outlet port 42 by the blower system 50 during the second mode of engine operation creates a suction effect to circulate shell air from the top wall section 32A of the casing wall 32 down the respective left and right side wall sections 32B, 32C toward the bottom wall section 32D. The circulation of shell air within the combustor shell 20 during less than full load operation, i.e., during the second mode of engine operation, provided by the air injection system 40 creates a more uniform shell air temperature distribution within the combustor shell 20. Otherwise, hotter shell air would tend to migrate to the top wall section 32A, thus resulting in hotter temperatures at the top wall section 32A than at the bottom wall section 32D.

Further, the cooling of the structure to be cooled within the turbine section 18, e.g., the rows of rotatable turbine blades $T_B$, the blade disc structures $B_{DS}$, the turbine disc cavities $T_{DC}$, etc., by the secondary path air supplied to the rotor cavity $R_C$ by the air injection system 40 during the second mode of engine operation reduces thermal expansion of the blade disc structure $B_{DS}$ and the turbine blades $T_B$. Moreover, the cooling of the structure to be cooled within the turbine section 18 creates a more uniform temperature distribution within the turbine section 18, as hotter air tends to migrate to the top of the casing 30 in the turbine section 18, thus resulting in hotter temperatures at the top of the casing 30 than at the bottom.

The more uniform temperature distributions within the combustor shell 20 and the turbine section 18 and the reduction in thermal expansion of the blade disc structure $B_{DS}$ and the turbine blades $T_B$ effected by the air injection system 40 during the second mode of engine operation are believed to reduce or prevent issues that might otherwise result from components within and around the combustor shell 20 and the turbine section 18 thermally growing at different rates, such as distortion of the engine casing 30 and/or rubbing of tips $T_T$ of the turbine blades $T_B$ (see FIG. 1A) in the turbine section 18 against ring segments $R_S$ (see FIG. 1A) located outwardly from the turbine blades $T_B$, thus lengthening a lifespan of these components and maintaining a tight blade tip $T_T$ clearance during full load operation for improved turbine efficiency. The reduction/prevention of rubbing of the turbine blade tips $T_T$ on the ring segments $R_S$ also reduces/prevents tip oxidation due to overheating, as rubbing of these components could otherwise block off cooling holes formed in the turbine blade tips $T_T$.

Moreover, actively cooling the structure to be cooled in the turbine section 18, and more specifically, the turbine rotor 24, effected by the air injection system 40 during the second mode of engine operation is believed to provide a reduction in length of service outages of the engine 10. For example, the engine 10 may be able to be serviced sooner if the air injection system 40 is used to cool the turbine rotor 24, as, without the air injection system 40, the engine 10 may have to be in a turning gear state or a shut down state for at least about 14 hours before it can be serviced, as the turbine rotor 24 would be too hot for servicing of the turbine section 18. It is believed that by using the air injection system 40 to cool the turbine rotor 24, the engine 10 may be serviced sooner. Further, the air injection system 40 provides a simultaneous, combined approach for cooling the turbine rotor 24 and reducing/preventing distortion of the engine casing 30 by creating a more uniform temperature distribution within the engine casing 30.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:
1. A gas turbine engine comprising:
  a compressor section where air pulled into the engine is compressed;
  a combustion section where fuel is mixed with at least a portion of the compressed air from the compressor section and burned to create hot combustion gases;
  a turbine section where the hot combustion gases from the combustion section are expanded to extract energy therefrom, wherein at least a portion of the extracted energy is used to rotate a turbine rotor during a first mode of engine operation comprising full load operation;
  a rotor chamber in communication with structure to be cooled within the turbine section;
  at least one rotor cooling pipe that injects primary path air extracted from the engine into the rotor chamber during the first mode of engine operation; and
  an air injection system comprising:
    at least one outlet port through which secondary path air is extracted from the engine only during a second mode of engine operation comprising less than full load operation;
    the at least one rotor cooling pipe, which is used to inject the secondary path air extracted from the at least one outlet port into the rotor chamber during the second mode of engine operation;
    a piping system that provides fluid communication between the at least one outlet port and the at least one rotor cooling pipe;
    a blower system for extracting the secondary path air from the engine through the at least one outlet port and for conveying the extracted secondary path air through the piping system and the at least one rotor cooling pipe into the rotor chamber; and
    a valve system that is opened and closed by a controller based on a temperature differential between a top wall section of an engine casing and a bottom wall section of the engine casing to selectively allow and prevent secondary path air to be extracted from the engine and conveyed through the piping system by the blower system into the rotor chamber.

2. The gas turbine engine of claim 1, wherein the at least one outlet port is located in a portion of the engine casing that surrounds the combustion section.

3. The gas turbine engine of claim 2, wherein the engine casing portion defines a combustor shell and wherein the secondary path air extracted through the at least one outlet port comprises shell air from the combustor shell.

4. The gas turbine engine of claim 3, wherein the at least one outlet port is located in the bottom wall section of the engine casing portion.

5. The gas turbine engine of claim 3, wherein the primary path air injected by the at least one rotor cooling pipe into the rotor chamber during the first mode of engine operation comprises shell air from the combustor shell and is extracted through the at least one outlet port.

6. The gas turbine engine of claim 1, wherein the valve system is:
  opened by the controller upon initiation of a turn down operation to transition the engine to one of a shut down state and a turning gear state; and
  closed by the controller upon initiation of a start-up operation to transition the engine to the first mode of engine operation.

7. The gas turbine engine of claim 6, wherein the turbine rotor is not rotated by energy from combustion gases during the shut down state or the turning gear state.

8. The gas turbine engine of claim 1, wherein the rotor chamber is at least partially located in the combustion section.

9. A method for operating a gas turbine engine comprising:
  compressing air in a compressor section of the engine;
  mixing fuel and at least a portion of the compressed air and burning the mixture in a combustion section of the engine to create hot combustion gases;
  expanding the hot combustion gases to extract energy therefrom in a turbine section of the engine, wherein at least a portion of the extracted energy is used to rotate a turbine rotor during a first mode of engine operation comprising full load operation;
  injecting primary path air extracted from the engine into a rotor chamber through at least one rotor cooling pipe during the first mode of engine operation, the injected primary path air providing cooling to structure to be cooled within the turbine section;

during a second mode of engine operation comprising less than full load operation:
enabling operation of a blower system to:
extract secondary path air from a combustor shell through at least one outlet port located in an engine casing portion that surrounds the combustion section;
convey the extracted secondary path air through a piping system to the at least one rotor cooling pipe; and
inject the extracted secondary path air into the rotor chamber through the at least one rotor cooling pipe.

10. The method of claim 9, wherein secondary path air is not injected into the rotor chamber by the at least one rotor cooling pipe during the first mode of engine operation.

11. The method of claim 10, wherein a valve system is:
open during the second mode of engine operation to allow secondary path air from the combustor shell to be conveyed through the piping system into the rotor chamber by the blower system; and
closed during the first mode of engine operation to prevent secondary path air from being conveyed through the piping system by the blower system.

12. The method of claim 11, wherein the valve system is opened and closed by a controller based on a temperature differential between a top wall section of the engine casing portion and a bottom wall section of the engine casing portion.

13. The gas turbine engine of claim 11, wherein the valve system is:
opened by a controller upon initiation of a turn down operation to transition the engine to one of a shut down state and a turning gear state; and
closed by the controller upon initiation of a start-up operation to transition the engine to the first mode of engine operation.

14. A gas turbine engine comprising:
a compressor section where air pulled into the engine is compressed;
a combustion section where fuel is mixed with at least a portion of the compressed air from the compressor section and burned to create hot combustion gases;
a turbine section where the hot combustion gases from the combustion section are expanded to extract energy therefrom, wherein at least a portion of the extracted energy is used to rotate a turbine rotor during a first mode of engine operation comprising full load operation;
a rotor chamber in communication with structure to be cooled within the turbine section;
at least one rotor cooling pipe that injects primary path air extracted from the engine into the rotor chamber during the first mode of engine operation; and
an air injection system comprising:
at least one outlet port through which secondary path air is extracted from the engine only during a second mode of engine operation comprising less than full load operation, the at least one outlet port located in a portion of an engine casing that surrounds the combustion section;
the at least one rotor cooling pipe, which is used to inject the secondary path air extracted from the at least one outlet port into the rotor chamber during the second mode of engine operation;
a piping system that provides fluid communication between the at least one outlet port and the at least one rotor cooling pipe;
a blower system for extracting the secondary path air from the engine through the at least one outlet port and for conveying the extracted secondary path air through the piping system and the at least one rotor cooling pipe into the rotor chamber; and
a valve system that is:
closed during the first mode of engine operation to prevent secondary path air from being extracted from the engine and conveyed through the piping system by the blower system; and
open during the second mode of engine operation to allow secondary path air to be extracted from the engine and conveyed through the piping system by the blower system.

15. The gas turbine engine of claim 14, wherein the at least one outlet port is located in a bottom wall section of the engine casing portion.

16. The gas turbine engine of claim 15, wherein the valve system is opened and closed by a controller based on a temperature differential between a top wall section of the engine casing portion and the bottom wall section of the engine casing portion.

17. The gas turbine engine of claim 14, wherein the valve system is:
opened by a controller upon initiation of a turn down operation to transition the engine to one of a shut down state and a turning gear state; and
closed by the controller upon initiation of a start-up operation to transition the engine to the first mode of engine operation.

18. The gas turbine engine of claim 14, wherein the primary path air injected by the at least one rotor cooling pipe into the rotor chamber during the first mode of engine operation and the secondary path air injected by the at least one rotor cooling pipe into the rotor chamber during the second mode of engine operation are cooled in an external cooler before being provided to the at least one rotor cooling pipe.

19. The gas turbine engine of claim 1, wherein the valve system is:
closed during the first mode of engine operation to prevent secondary path air from being extracted from the engine and conveyed through the piping system by the blower system; and
opened and closed by the controller during the second mode of engine operation based on the temperature differential between the top and bottom wall sections of the engine casing selectively to allow and prevent secondary path air to be extracted from the engine and conveyed through the piping system by the blower system.

20. The gas turbine engine of claim 14, wherein:
the engine casing portion defines a combustor shell containing shell air;
during the first mode of engine operation, at least a portion of the shell air is burned with fuel to create the hot combustion gases;
the primary path air injected by the at least one rotor cooling pipe into the rotor chamber during the first mode of engine operation comprises shell air extracted through the at least one outlet port; and
the secondary path air extracted through the at least one outlet port comprises shell air.

* * * * *